(12) United States Patent
Black et al.

(10) Patent No.: US 7,535,868 B2
(45) Date of Patent: May 19, 2009

(54) ASSEMBLY, AND ASSOCIATED METHOD, FOR FACILITATING CHANNEL FREQUENCY SELECTION IN A COMMUNICATION SYSTEM UTILIZING A DYNAMIC FREQUENCY SELECTION SCHEME

(75) Inventors: Simon A. Black, Cambridge (GB); Steven Gray, Espoo (FI); Venkatesh Vadde, Fremont, CA (US)

(73) Assignee: Nokia Corporation, Espoo (FI)

( * ) Notice: Subject to any disclaimer, the term of this patent is extended or adjusted under 35 U.S.C. 154(b) by 760 days.

(21) Appl. No.: 10/827,899

(22) Filed: Apr. 20, 2004

(65) Prior Publication Data
US 2005/0013275 A1    Jan. 20, 2005

Related U.S. Application Data

(63) Continuation of application No. 10/097,977, filed on Mar. 14, 2002, now Pat. No. 6,738,599.

(60) Provisional application No. 60/318,070, filed on Sep. 7, 2001.

(51) Int. Cl.
*H04Q 7/00* (2006.01)
(52) U.S. Cl. .................. 370/329; 370/461; 370/350; 370/331; 455/62; 455/447; 455/450; 455/451; 455/452.1

(58) Field of Classification Search ............ 455/62, 455/448, 450, 451, 454; 370/350, 345, 330, 370/328, 331, 461
See application file for complete search history.

(56) References Cited

U.S. PATENT DOCUMENTS

| 2001/0031626 | A1  | 10/2001 | Lindskog et al. |
| 2002/0097696 | A1  | 7/2002  | Kossi et al. |
| 2003/0002456 | A1* | 1/2003  | Soomro et al. ............ 370/328 |
| 2003/0037033 | A1* | 2/2003  | Nyman et al. ............... 707/1 |
| 2003/0086437 | A1* | 5/2003  | Benveniste ................ 370/461 |
| 2003/0174690 | A1* | 9/2003  | Benveniste ................ 370/350 |
| 2007/0297366 | A1* | 12/2007 | Osann ....................... 370/331 |

* cited by examiner

*Primary Examiner*—David Q Nguyen
(74) *Attorney, Agent, or Firm*—Foley & Lardner LLP

(57) ABSTRACT

An assembly, and an associated method, for an ad hoc network, such as an independent basic service set defined in an IEEE 802.11 protocol specification. A channel map is created and maintained at each mobile station of the ad hoc network. The channel map is populated with channel characteristic indicia of channel frequencies that might be available upon which to be used in the ad hoc network to effectuate communications between the mobile stations. Information related to the channel map created and maintained at each of the mobile stations is exchanged, and any of the mobile stations is selectable to form a DFS owner that defines the channel frequency to be used upon which to define a communication channel for communications in the network.

16 Claims, 3 Drawing Sheets

24

| 28 | 32 |
|---|---|
| Channel Number a | Channel Characteristic a |
| Channel Number b | Channel Characteristic b |
| Channel Number c | Channel Characteristic c |
| ... | ... |

Length (octets):   1           1

| Bit | 0 | 1 | 2 | 3 | 4 | 5 | 6 | 7 |
|---|---|---|---|---|---|---|---|---|
| Sub-Field | Energy | | | BSS | Foreign PLCP | Periodic | Un-Measured | Local |

ASSEMBLY, AND ASSOCIATED METHOD, FOR FACILITATING CHANNEL FREQUENCY SELECTION IN A COMMUNICATION SYSTEM UTILIZING A DYNAMIC FREQUENCY SELECTION SCHEME

CROSS-REFERENCE TO RELATED APPLICATION

The present application is a continuation of application Ser. No. 10/097,977, filed on 14 Mar. 2002, now U.S. Pat. No. 6,738,599 which claimed the benefit of Provisional Patent Application No. 60/318,070, filed on 7 Sep. 2001.

The present invention relates generally to communications in a communication system, such as a WLAN (wireless local area network) operable pursuant to an IEEE 802.11 standard in an unregulated spectrum band that utilizes a dynamic frequency selection (DFS) scheme. More particularly, the present invention relates to an assembly, and an associated method, by which to facilitate dynamic channel frequency selection pursuant to the dynamic frequency selection in an infrastructure-free, ad hoc network of communication stations in which any of the communication stations of the ad hoc network is able to select the channel frequency to be used to effectuate communications. Channel maps are maintained at each of the communication stations of the network. The channel maps contain channel characteristic indicia associated with conditions upon channels defined about various frequencies. When a communication station is designated as a DFS owner, i.e., is placed in charge of the channel frequency selection, the indicia stored at the channel map thereof is used in the channel frequency selection.

BACKGROUND OF THE INVENTION

Many varied advancements in technology have permitted the introduction, and popularization, of new types of communication systems as well as improvements to existing types of communication systems. Generally, in such new, as well as such improved, communication systems, the rates at which the data is transmitted, as well as the corresponding amount of data permitted to be communicated, has increased.

New types of, as well as improvements to existing, radio communication systems are exemplary of communication systems made possible as a result of advancements in communication technologies. Communication channels of a radio communication system are formed upon radio links, thereby obviating the need for conventional wireline connections to be formed between communication stations operable therein. Some radio communication systems, for instance, take advantage of the lack of wireline connections to form mobile communication systems in which one or more of the communication stations operable therein is capable of movement, not affixed in fixed positions.

Communication capacity of a communication system is sometimes limited due to bandwidth limitations. That is to say, the bandwidth capacity of the communication channel, or channels, available to the communication system to communicate data is sometimes limited. And, the limited capacity of the communication channel, or channels, limits the increase of the communication capacity of the communication system.

Communication channel bandwidth limitations are sometimes particularly acute in a radio communication system. Generally, a limited portion of the electromagnetic spectrum is allocated to a radio communication system upon which to define communication channels to communicate thereon. The communication capacity of the communication system is, many times, limited by such allocation. And, sometimes, the only manner by which to increase the communication capacity of the radio communication system is through more efficient use of the allocated spectrum.

The use of digital communication techniques permits the bandwidth efficiency of communications in the communication system to be increased. Use of such digital communication techniques is of particular advantage for use in a radio communication system due to the particular need efficiently to utilize the spectrum allocated thereto upon which to define communication channels thereon. Information that is to be communicated using digital communication techniques is digitized. The digitized information is formatted, such as into data packets, and the formatted data is communicated between communication stations. Individual ones, or groups, of the data packets can be communicated at discrete intervals and, once communicated, concatenated together to recreate the informational content of the digitized information.

As the data packets can be communicated at discrete intervals, a communication channel need not be dedicated for a single communication session between a pair of communication stations. Instead, the channel can be shared amongst a plurality of communication station-pairs to effectuate a plurality of separate communication sessions. Multiple increases in the communication capacity of a communication system are sometimes, thereby, provided.

Conventional LANs (local area networks) typically utilize a data packet protocol by which to communicate between nodes, i.e., communication stations, of the LANs. Wireless networks, operable in manners analogous to operation of conventional wired LANs, have also been developed and communicate data packets by way of communication channels defined upon a radio link, thereby to effectuate communications between communication stations.

A standard protocol promulgated by the IEEE (Institute of Electrical and Electronic Engineers), the 802.11 standard, sets forth the operational parameters of a wireless LAN.

Proposals have been set forth to utilize an unlicensed frequency band located at 5 GHz for WLANs. A variant of the 802.11 standard has also been promulgated for such WLANs.

Due to the unlicensed nature proposed of this 5 GHz frequency band, more than one WLAN might be installed over a common geographical area. And, other types of radio communication systems might also be installed over the same geographical area to operate, or to have frequency harmonics that have significant components at the 5 GHz band. Therefore, while the unstructured nature of an unlicensed band provides significant design freedom in the design of a communication system to be operable therein, the same unlicensed nature of the band also increases the possibility that signals generated during operation of one of the communication systems within the frequency band might generate signals that interfere with operation of another communication system operable at the same frequency band.

Use of frequency levels within the allocated band that exhibit lowest amounts of interference would best ensure that communication qualities of communications would not be degraded. Appropriate selection of the frequency levels is needed. And, subsequent reselection of the frequency levels is needed as communication conditions at the selected frequency level change.

The 802.11 standard sets forth system requirements for ad hoc networks, i.e., infrastructure-free networks of mobile stations (STAs). So, not only is there a need for dynamic frequency selection of the channel frequencies at which communication stations communicate data packets, but, also, the selection scheme must not be predicated upon use of a fixed control system.

A manner by which to provide for dynamic frequency selection in an ad hoc network of mobile stations is, therefore, needed.

It is in light of this background information related to communications in a radio communication system that the significant improvements of the present invention have evolved.

The present invention, accordingly, advantageously provides apparatus, and an associated method, for facilitating communications in a communication system that utilizes a dynamic frequency selection scheme. In a dynamic frequency selection scheme, the channel frequencies used to effectuate communication of data between communication stations operable therein are not set, but rather, are dynamically selected. A radio communication system to be operable pursuant to an IEEE 802.11 standard in the 5 GHz frequency band is exemplary of a communication system that utilizes a dynamic frequency selection scheme.

Through operation of an embodiment of the present invention, dynamic channel frequency selection pursuant to the dynamic frequency selection scheme is facilitated in an infrastructure-free, ad hoc network of communication stations. Any of the communication stations of the ad hoc network is able to select the channel frequencies to be used to effectuate communications.

In one aspect of the present invention, channel maps are maintained at each of the communication stations of the network. The channel maps contain channel characteristic indicia associated with communication conditions upon channels defined about various frequencies. When a communication station is designated as a DFS (dynamic frequency selection) owner, i.e., is placed in charge of the channel frequency selection, the indicia stored at the channel map is used in the channel frequency selection.

In another aspect of the present invention, measurements are made by one or more of the communication stations of channel conditions at different channel frequencies available to be used upon which to define communication channels. Measurements of the channel conditions at different channel frequencies is made at periodic, or other selected, intervals and is effectuated, for instance, by tuning a receive part of the communication station to the channel frequencies that might be available for selection upon which to communicate. Channel frequencies that appear to be used for communication, or other, operations are indicated as such and a channel characteristic indicia indicating the frequency unavailability is noted in the channel map of the communication station. When implemented at the unlicensed 5 GHz band, other communication systems might be using the channel frequency to communicate thereon, and, also, radar, and other, devices might also be operating at the measured channel frequencies. And, also, noise might also be exhibited at the channel frequencies. Indications of the noise level also are channel characteristics, indicia of which are stored at the channel map.

In another aspect of the present invention, channel map information created, or stored, at one communication station of the ad hoc network is communicated to others of the communication stations of the network.

In an implementation in which the ad hoc network is operable generally pursuant to the protocol set forth in the IEEE 802.11 standard, the channel map information is communicated between the communication stations (STAs) of the network during beacon periods defined therein on beacon signals sent between the communication stations. Each of the communication stations is able both to monitor channel frequencies to make determinations of conditions at the different channel frequencies and also to receive measurements made by others of the communication stations. The measurements made locally, and elsewhere, are averaged together and stored at the channel map of the communication station. Or, if the measured channel characteristic indicia at the communication station differs significantly from the values of the indicia measured elsewhere, the locally-measured indicia is inserted into the channel map of that communication station. As each communication station maintains a channel map of the channel characteristic indicia of various channel frequencies, any of the communication stations is able to become a DFS owner and to select the channel frequencies at which communication channels are defined and communications are effectuated between the stations of the ad hoc network. Change in the channel frequency at which the communications are effectuated are changed as necessary, best to ensure adequate communications between the communication stations of the ad hoc network.

When implemented in an ad hoc network of 802.11-compatible mobile stations, any of the mobile stations is capable of becoming the DFS owner, operable to define the channel frequency at which the communication channel is defined. Updating of the values of the channel characteristic indicia is made at selected intervals so that the channel map information is readily updated.

In these and other aspects, therefore, an assembly, and an associated method, is provided for a radio communication system formed of an ad hoc network of communication stations. Communications by the communication stations of the ad hoc network are effectuated upon dynamically-selected channel frequencies. Dynamic frequency selection of a channel frequency used by the communication stations of the ad hoc network to communicate thereon is facilitated. At least a first channel map is formed at least at a first communication station of the ad hoc network. The first channel map stores channel characteristic indicia associated with a first channel frequency and at least a second channel frequency. The channel characteristic indicia stored thereat is selectably used in the dynamic frequency selection of the channel frequency used by the communication stations to communicate thereon.

A more complete appreciation of the present invention and the scope thereof can be obtained from the accompanying drawings that are briefly summarized below, the following detailed description of the presently-preferred embodiments of the invention, and the appended claims.

BRIEF DESCRIPTION OF THE DRAWINGS

FIG. 2 illustrates a representation of an exemplary channel map formed pursuant to operation of an embodiment of the present invention.

FIG. 3 illustrates a representation of the format of exemplary channel characteristic indicia contained in the channel map shown in FIG. 2.

DETAILED DESCRIPTION

Figure 1:
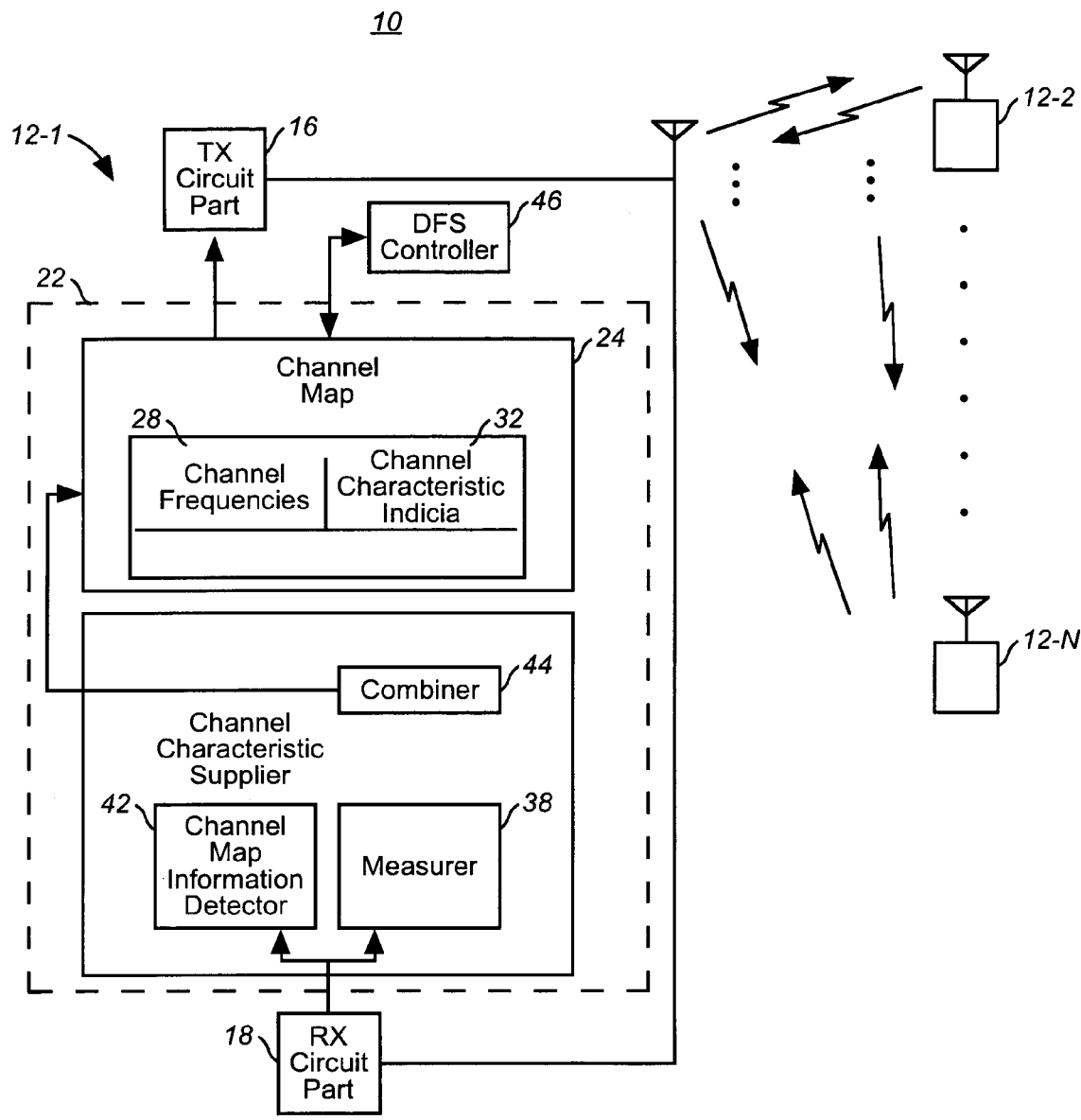
FIG. 1 illustrates a functional block diagram of a communication system in which an embodiment of the present invention is embodied as a portion thereof.

Referring first to FIG. 1, a communication system, shown generally at 10, forms an ad hoc network of mobile stations 12. Here, N mobile stations, 12-1 through 12-N, together define the ad hoc network. The number of members of the ad hoc network is a non-static number, and mobile stations forming members of the network change over time due to, e.g., movement of individual ones of the mobile stations or change of state of individual ones of the mobile stations.

In the exemplary implementation, the mobile stations forming the ad hoc network of the communication system 10 form a wireless local area network (WLAN) that is operable pursuant to an IEEE 802.11 standard. While the following description of operation of an embodiment of the present invention shall describe its implementation as a portion of a communication system operable generally pursuant to the IEEE 802.11 standard, operable at the 5 GHz range, the teachings of the present invention are analogously applicable in other types of communication systems, and an embodiment of the present invention can analogously be described with respect to implementation in other types of communication systems.

The IEEE 802.11 standard sets forth operational parameters related to an independent basic service set (IBSS) in which mobile stations 12 that form members of the IBSS operate in an ad hoc networking mode in which the mobile stations communicate with one another without the use of a fixed-site central control device, referred in the IEEE 802.11 operating protocol as an access point.

The IEEE 802.11 standard pertaining to deployment of a communication system at the 5 GHz frequency band in Europe sets forth system requirements for WLAN systems to distribute electromagnetic energy emanations over the allocated frequency band. As the frequency band is an unlicensed band, communications, or other electromagnetic transmissions, might also be generated concurrent to operation of the WLAN system. Dynamic frequency selection (DFS) is required to select the frequencies within the allocated band that are available upon which to define communication channels. Through dynamic frequency selection, frequencies within the band used by other communication systems, such as microwave communication networks and radar devices, are noted and excluded from availability to be used by the WLAN system for communications between the mobile stations thereof. As the IBSS forms an infrastructure-free, ad hoc network, operations required pursuant to the dynamic frequency selection process require their implementation by the mobile stations that form the network.

Instead of a central control device, one of the mobile stations (STAs) 12 of the network is designated as a DFS (dynamic frequency selection) owner that, for at least a designated period, controls the DFS functions. As any of the mobile stations might be designated as the DFS owner, each of the mobile stations must have the capacity of performing the functions of the DFS owner.

An embodiment of the present invention facilitates the capability of a mobile station to perform the dynamic frequency selection operation required to select a channel frequency upon which to designate a communication channel for communications in the ad hoc network. In the exemplary implementation, each of the mobile stations includes an embodiment of the present invention, providing each mobile station with the capability of selecting information regarding the radio environment about the mobile stations of the ad hoc network to permit proper selection of channel frequencies to be used upon which to define communication channels for communications between the mobile stations.

Operation of an embodiment of the present invention further provides for the communication of channel quality information between the mobile stations of the ad hoc network.

The mobile station 12-1 is exemplary of each of the other mobile stations 12-2 through 12-N. And, the mobile station includes, in conventional manner, transceiver circuitry, here including a transmit circuit part 16 and a receive circuit part 18. The mobile station is also shown to include apparatus 22 of an embodiment of the present invention. The apparatus is formed of elements represented functionally in the figure. The elements forming the apparatus are implemented in any desired manner, such as, in part, as algorithms executable by processing circuitry. The apparatus is coupled both to the transmit and receive circuit parts 16 and 18.

The apparatus includes a channel map 24 that contains a listing 26. The listing forms a sequence of channel frequencies 28 and characteristic indicia 32 associated with respective ones of the channel frequencies.

The apparatus further includes a channel characteristic supplier 36 that operates to populate the listing of the channel map with values of the characteristic indicia 32. Here, the channel characteristic supplier is represented to be coupled to the channel map by way of the line 38 to provide the values of the characteristic indicia thereto.

The channel characteristic supplier includes a channel frequency measurer 38 that is coupled to receive indications of channel conditions of various channel frequencies to which the receive circuit part 18 tunes. In one implementation, the channel characteristic supplier instructs the receive circuit part 18 to tune to different channel frequencies, and the measurer operates to measure energy levels, and detect for data generated on, the channel frequencies to which the receive circuit part tunes. And, the receive circuit part also detects channel map information communicated by other mobile stations of the ad hoc network. A channel map information detector 42 is here representative of functionality of the channel characteristic supplier to detect the channel map information communicated to the mobile station by other mobile stations in the network. Values determined by the measurer 38 form local values of channel characteristic indicia, and the channel information detector forms global values of channel characteristic indicia.

The channel characteristic supplier 36 here further includes a combiner 44 selectably operable to combine global and local values of the channel characteristic indicia thereto-gether. The combiner, in one implementation, operates to compare local values with corresponding global values. If the local value differs, greater than a selected amount, with corresponding global values, the local value is substituted for the global value and provided to the channel map. Otherwise, the values are combined together, such as to form a combined, average value. And, the average value is provided to the channel map to populate the appropriate listing to input with such value.

Thereby, during operation of the apparatus 22, a channel map is created, and maintained, with indications of channel characteristic indicia of various channel frequencies. The values stored at the channel map are retrieved and used when the mobile station forms the DFS owner during a selected time period. Here, the DFS controller 46, coupled to the channel map, is representative of the functioning of the mobile station as a DFS owner. The DFS controller operates, when the mobile station forms the DFS owner, to select the channel frequency upon which to define communication channels for communication between the mobile stations of the ad hoc network. Selections made by the DFS controller are responsive to values of the channel characteristic indicia 32 stored at the channel map. And, the contents of the channel map are selectably provided to the transmit circuit part 16 for communication therefrom to other mobile stations of the ad hoc network.

FIG. 2 illustrates the channel map 24 of the apparatus 22 shown in FIG. 1. The channel map shown in the figure is exemplary of a channel map created, and maintained, during operation of an embodiment of the present invention. In the exemplary implementation, the channel map provides a manner by which to rank candidate channel frequencies based upon channel qualities indicated by values of the channel characteristic indicia. Here, the listing includes a channel, identified by number, in the column 28 for each channel to which a mobile station is tunable. And, the column 32 includes corresponding channel characteristic indicia associated with such channels. When the channel characteristic indicia is based, in whole or in part, upon channel characteristic indicia measured elsewhere, the values stored at the channel map are referred to as being global characteristic values. In the exemplary implementation, each of the columns, columns 28 and 32, are of single-octet bit lengths.

In exemplary operation of the apparatus 22 (shown in FIG. 1) together with the DFS controller 46 (also shown in FIG. 1) permits any mobile station of the ad hoc network to become a DFS owner and select the channel frequency at which communication channels are defined and upon which communications are effectuated between the mobile stations of the network. Channel frequencies that are occupied by a radar system or microwave system are removed from consideration for availability to be used by the ad hoc network. And, channel frequencies upon which unrecognized BSS (basic service set) communications, i.e., non-IEEE-802.11-type communications, are also removed from consideration for selection. And, channel frequencies utilized by another 802.11 basic service set are additionally removed from consideration for usage. Amongst the remaining channel frequencies that might be available, selection is made of the channel frequencies that exhibit the best characteristics, e.g., the channel frequencies that exhibit the smallest levels of energy-based interference are selected.

In assessing the quality of the channel frequency, verification of the following symptoms are verified in the exemplary implementation. First, determination is made whether repeating CCA patterns are evident upon the channel frequency. Such repeating patterns indicate radar transmission. And, determination is made whether valid preambles or signal fields are detected. If so, such detection indicates that other basic service sets are operating at the channel frequency. And, determination is made of energy-based levels. The greater the energy-based levels, the greater the severity of interference at the channel frequency.

Thereby, each mobile station measures characteristics upon the channel frequencies to which the receive circuit part of the mobile station becomes tuned.

Thereby, each mobile station measures channel frequencies to determine whether BSSs, valid preambles, and repeating CCA patterns are communicated upon the channel frequency to which the receive circuit part is tuned. And, additionally, energy levels of noise on the channel frequency are also measured. Responsive to such determinations and measurements, the channel frequency used by the ad hoc network to communicate thereon is selected.

The duration of the scans is implementation-dependent. And, the channel maps of the respective mobile stations of the network are created and information thereof is exchanged between the mobile stations.

FIG. 3 illustrates the format of an exemplary entry of channel characteristic indicia 32 forming part of the listing forming the channel map 24 shown in FIGS. 1 and 2. Here, the channel characteristic indicia is formed of a single octet in length formed of eight bits, designated 0 through 7 in the figure. The three most significant bits form the first sub-field 52, the next most-significant-bit 54 forms a BSS flag, the fifth most-significant-bit forms a foreign PLCP header flag 56, and the sixth most-significant-bit forms a periodicity flag 58. And, the following bit forms a local flag 62 while the least most-significant-bit forms another local flag 64.

The energy sub-field is of values that define a measurement of the severity of energy-based interference measured during a measurement interval. The BSS flag is of a logical one or a logical zero value, dependent upon whether a BSS was detected at the channel frequency by either reception of a beacon, or a probe response frame, or, alternately, reception of a valid frame with either the toDS, or fromDS, flag set. Otherwise, the flag is set to a logical zero value.

The foreign PLCP header flag is set if at least one PLCP preamble is detected at the channel frequency, but no valid SIGNAL field was subsequently detected. Otherwise, the foreign PLCP flag is set to a logical zero value.

The periodicity flag is set if at least two consecutive CCA busy on/off patterns are periodic. A signal is classified as being periodic if at least two consecutive CCA busy duration and CCA busy intervals are identical. The margin of error for such measurements is no more than plus or minus one time slot. Otherwise, the flag value is set to a zero logical value.

The unmeasured local flag 62 is set to a logical one value if the channel has not been measured. Otherwise, the flag is set to a logical zero value. And, the local flag 64 is set to a logical one value if the channel characteristics for the channel in the global channel map have been overridden by the local mobile station. Otherwise, the local flag value is set to a logical zero value.

By using this exemplary encoding scheme, and by ignoring the local bits of each octet and thereafter sorting the channel quality octets in decreasing order of magnitude, the smallest-value octet indicates the channel frequency that exhibits the best communication conditions. The larger the magnitude of the octet, the less desirable that use of the channel frequency would be.

Figure 4:
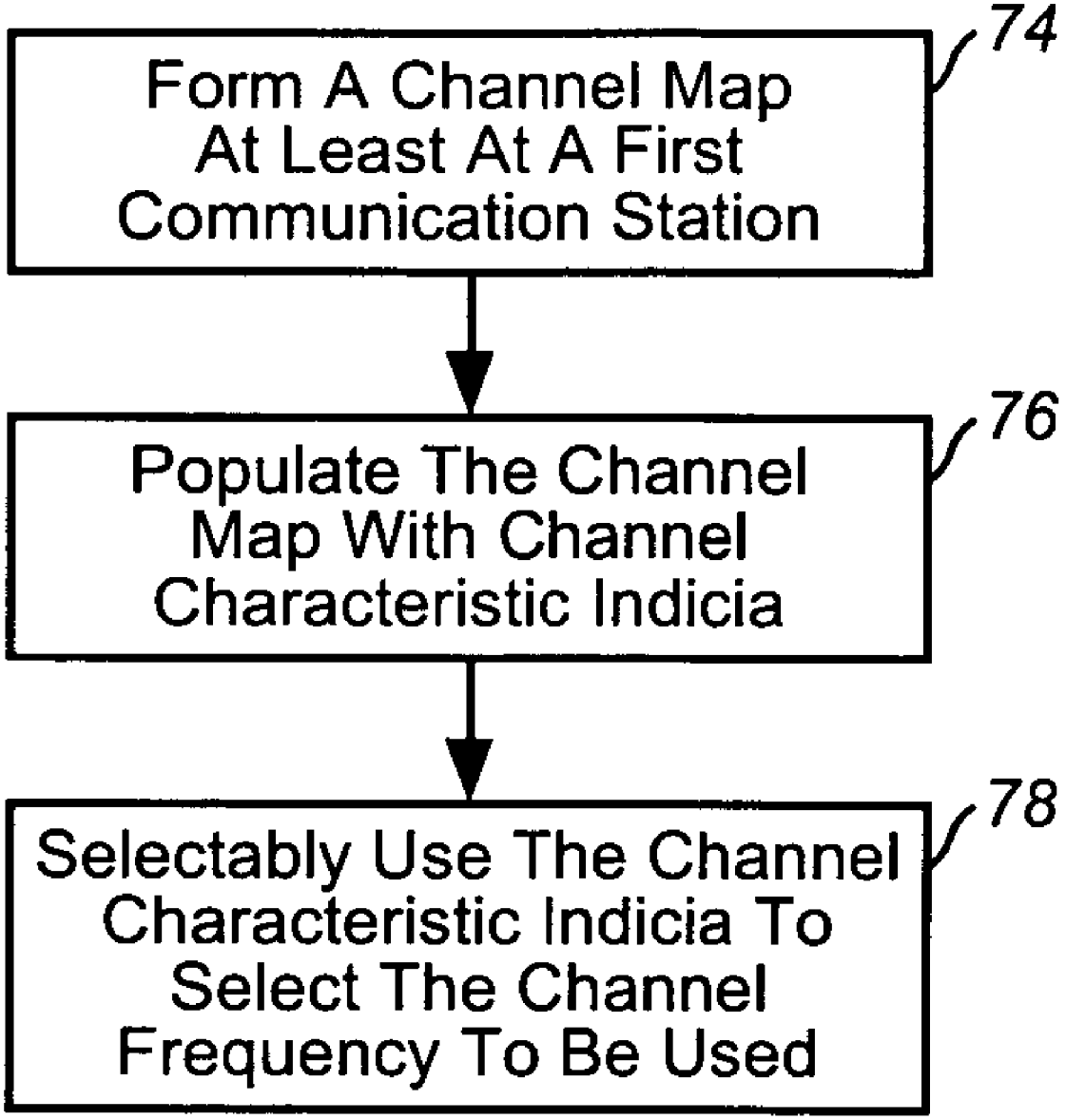
FIG. 4 illustrates a method flow diagram listing the method steps of the method of operation of an embodiment of the present invention.

FIG. 4 illustrates a method flow diagram, shown generally at 72, representative of an embodiment of the present invention. The method facilitates dynamic frequency selection of a channel frequency used by communication station of an ad hoc network of communication stations to communicate thereon.

First, and as indicated by the block 74, at least a first channel map is formed at least at a first communication station of the ad hoc network. The first channel map stores channel characteristic indicia associated with a first channel frequency and at least a second channel frequency. Then, and as indicated by the block 76, the at least first channel map is populated with the channel characteristic indicia. And, as indicated by the block 78, values of the channel characteristic indicia are selectably used to select the channel frequency to be used by the communication stations to communicate thereon.

Thereby, a manner is provided by which to select channel frequencies to be used to effectuate communication of data between communication stations of an ad hoc network. As a channel map is created and maintained at each mobile station, any of the mobile stations is able to form a DFS owner to select the channel frequency to be used to communicate thereon.

The previous descriptions are of preferred examples for implementing the invention, and the scope of the invention should not necessarily be limited by this description. The scope of the present invention is defined by the following claims:

The scope of the present invention is defined by the following claims:

1. In an ad hoc communication network having a plurality of communication stations operable pursuant to a protocol standard, the protocol standard defining a beacon period, an improvement of apparatus for at least a selected communication station of the plurality, said apparatus for dynamically selecting channel frequencies upon which to communicate data between the communication stations of the plurality, the selected channel frequencies selected from a plurality of potential channel frequencies, said apparatus comprising:

a channel frequency measurer selectably for measuring local indications of channel conditions on various of the potential channel frequencies within a selected range of frequencies;

a channel map populated with indications of channel conditions from the channel frequency measurer, said channel map selectably accessible pursuant to selection procedures by which to select the channel frequencies upon which to communicate the data; and a communication mechanism selectably for communicating the indications of channel conditions in the channel map during the beacon period.

2. The apparatus of claim 1 wherein the plurality of communication stations comprises a first communication station and at least a second communication station and wherein said apparatus is embodied at each of the first and at least second communication stations.

3. The apparatus of claim 2 wherein a selected one of the first and at least second selected communication stations is defined as a dynamic frequency selection owner during a selected time period and wherein said channel map of the selected one of the first and at least second selected communication stations is accessed to select which of the plurality of potential channel frequencies is selected to form the selected channel frequencies upon which to communicate the data.

4. The apparatus of claim 1 wherein said channel map comprises a listing formed of entries, each identifying the various of the channel frequencies together with the indications of channel conditions associated therewith, each of the channel frequencies and the indications of channel conditions associated therewith formatted according to a selected format.

5. The apparatus of claim 4 wherein the indications of channel conditions forming part of each entry of the listing of said channel map comprises an octet including at least one sub-field, values populating the at least the one sub-field determinative, at least in part, of which of the plurality of potential channel frequencies forms the selected channel frequencies.

6. The apparatus of claim 5 wherein the at least one sub-field is populated with values representative of interference on the channel frequency associated therewith.

7. The apparatus of claim 5 wherein the at least one sub-field comprises a basic service set indication value.

8. The apparatus of claim 5 wherein the at least one sub-field identifies a value of a PLCP header flag.

9. The apparatus of claim 5 wherein the at least one sub-field comprises a value of a periodicity flag.

10. The apparatus of claim 1 further comprising a dynamic frequency selection controller selectably for accessing values populating said channel map, said dynamic frequency selection controller for selecting the selected channel frequencies upon which to communicate the data.

11. A method for communicating in an ad hoc communication network having a plurality of communication stations operable pursuant to a protocol standard, the protocol standard defining a beacon period, the method for dynamically selecting channel frequencies upon which to communicate data between the communication stations of the plurality, the selected channel frequencies selected from a plurality of potential channel frequencies, said method comprising the operations of:

measuring local indications of channel conditions on various of the potential channel frequencies within a selected range of frequencies;

populating a channel map with the indications of channel conditions, the channel map selectably accessible pursuant to selection procedures by which to select the channel frequencies upon which to communicate the data; and communicating the indications of channel conditions in the channel map during the beacon period.

12. The method of claim 11 wherein the plurality of communication stations comprises a first communication station and at least a second communication station and wherein said operations of measuring, detecting, combining, and populating are performed at each of the first and at least second communication stations.

13. The method of claim 12 further comprising the operations of:

selecting one of the first and at least second communication stations as a dynamic frequency selection owner; and using the channel map at the dynamic selection owner selected during said operation of selecting pursuant to the selection procedures by which to select the channel frequencies upon which to communicate the data.

14. The method of claim 13 further comprising the operations of successively reselecting the one of the first and at least second communication stations as the dynamic frequency selection owner during successive time intervals.

15. The method of claim 13 further comprising the operation of choosing a channel frequency identified in the channel map of the dynamic frequency selection owner upon which to communicate the data.

16. The method of claim 15 wherein the channel frequency chosen during said operation of choosing exhibits levels of interference lower than a selected threshold.

* * * * *